(12) United States Patent
Fossum

(10) Patent No.: US 7,916,193 B2
(45) Date of Patent: Mar. 29, 2011

(54) INTERPOLATOR FOR A CMOS IMAGE SENSOR USING A DIGITAL REGISTER

(75) Inventor: Eric R. Fossum, La Crescenta, CA (US)

(73) Assignee: Round Rock Research, LLC, Mt. Kisco, NY (US)

( * ) Notice: Subject to any disclaimer, the term of this patent is extended or adjusted under 35 U.S.C. 154(b) by 1412 days.

(21) Appl. No.: 10/774,603

(22) Filed: Feb. 10, 2004

(65) Prior Publication Data

US 2004/0218074 A1 Nov. 4, 2004

Related U.S. Application Data

(63) Continuation of application No. 09/028,961, filed on Feb. 23, 1998, now Pat. No. 6,704,049.

(51) Int. Cl.
*H04N 3/14* (2006.01)
*H04N 5/335* (2006.01)
*H04N 9/04* (2006.01)

(52) U.S. Cl. ..................................... 348/272; 348/222.1

(58) Field of Classification Search .......... 348/272–281, 348/308, 222.1, 223.1; 250/208.1; 382/260–265
See application file for complete search history.

(56) References Cited

U.S. PATENT DOCUMENTS

| 5,652,621 A | * | 7/1997 | Adams et al. | 348/272 |
| 5,852,468 A | | 12/1998 | Okada | |
| 5,990,946 A | * | 11/1999 | Sakurai et al. | 348/222.1 |
| 6,091,851 A | * | 7/2000 | Acharya | 382/167 |
| 6,133,953 A | * | 10/2000 | Okada | 348/272 |
| 6,133,954 A | | 10/2000 | Jie et al. | |

FOREIGN PATENT DOCUMENTS

WO  WO 9720434 A1 * 6/1997
WO  WO 9735438 A1 * 9/1997

OTHER PUBLICATIONS

Robert E. Darling and Robert B. Pinter, "System Issues in the Implementation of Sensory Neural Network Photodetector Arrays," IEEE Pacific Rim Conference Paper, May 9-10, 1991, pp. 242-245.

* cited by examiner

*Primary Examiner* — Nelson D Hernández Hernández
(74) *Attorney, Agent, or Firm* — Lerner, David, Littenberg, Krumholz & Mentlik, LLP

(57) ABSTRACT

An imager has first and second photosensitive sites and an interpolator located in a semiconductor substrate. The first photosensitive site is configured to receive light having a spectral component, and the second photosensitive site is configured to measure the level of the spectral component in light received by the second photosensitive site. The interpolator is configured to estimate the level of the spectral component in the light received by the first photosensitive site based on the measurement by the second photosensitive site.

70 Claims, 6 Drawing Sheets

INTERPOLATOR FOR A CMOS IMAGE SENSOR USING A DIGITAL REGISTER

This application is a continuation of U.S. application Ser. No. 09/028,961 filed Feb. 23, 1998, now U.S. Pat. No. 6,704,049 the entire disclosure which is hereby incorporated by reference.

BACKGROUND

The invention relates to color interpolation.

FIG. 1 shows a semiconductor imager 10 (e.g., a complementary metal-oxide semiconductor (CMOS) imager) might be used to electrically capture "snapshots" of an optical image. The imager is used to convert an optical image into an electrical representation. The imager 10 accomplishes this conversion through the use of an array of sensing elements arranged as pixel cells 12 that sense the intensity of light coming from the image. The "exposure time" for each snapshot depends on an integration interval during which each pixel cell 12 integrates an indication of the number of photons of light striking the cell 12 (i.e., measures an intensity of light striking the cell 12) and provides an indication of the integrated value via an analog output signal. For CMOS imagers, on-chip analog conditioning circuitry 14 (e.g., circuitry to perform correlated double sampling and gain control) and an analog-to-digital converter (ADC) 16 process the analog outputs of the pixel cells 12 to provide a digital representation of the image which can be retrieved from the imager 10 through a parallel port interface 18.

The pixel cells 12 provide an indication of the intensity of light striking the cell 12. Hence, the above-described arrangement may be used to produce a monochrome or luminance only representation of the image. However, to produce color representations of the image, the imager also needs to provide information about primary colors (e.g., red, green and blue colors) of the image. To accomplish this, each pixel cell 12 is configured to sense the intensity level of light in one of the primary color bands. A typical way to accomplish this is to cover each pixel cell 12 with a spectrum-discriminating filter (e.g., a filter that only allows a red, green or blue color band to pass through the filter). As a result, some pixel cells 12 sense red light, some pixel cells 12 sense green light and some pixel cells 12 sense blue light. As an example, a multi-band filter pattern 20 (see FIG. 2) placed over the array of pixel cells 12 may have alternating red, green and blue filter stripes that extend along the columns of the array. Thus, each filter stripe of the pattern 20 configures one of the columns of the array to sense light in one of the primary color bands. As another example, the filter pattern may be checkered, instead of striped.

Each pixel cell 12 captures a portion of the image. To maximize the resolution of the image when reproduced on a display, it is desirable to form a one-to-one correspondence between the pixel cells 12 of the imager 10 and pixels of the display. However, with color imagers, three adjacent pixel cells 12 (each pixel cell 12 sensing a different primary color band) are typically used to provide the information needed to form one pixel on the display. Thus, when used to capture color images, the effective display pixel resolution of the imager 10 typically is one third of the actual pixel cell 12 resolution.

For purposes of preserving a one-to-one correspondence between the pixel cells 12 and the pixels of the display, one solution is to form an imager having three times as many pixel cells as corresponding pixels of the display to compensate for the three primary colors. Referring to FIG. 3, another solution is to use three imagers 22, 24, and 28, one for each primary color band of the image. Thus, for example, one imager 22 (covered by a red filter) senses red light, one imager 24 (covered by a green filter) senses green light, and one imager 26 (covered by a blue filter) senses the blue light coming from the image. Dichroic plates 28 may be used to split the light into beams into its primary colors.

Referring to FIG. 4, a third solution might be to use an off chip discrete-time signal processing (DSP) engine 30 to interpolate the two missing colors for each pixel cell 12. To accomplish this, the DSP engine 30 processes the color information provided by adjacent pixel cells 12. Typically, nearest neighbors are weighted with predetermined coefficients and averaged to determine a color at a particular pixel cell location. For example, referring back to FIG. 1, a pixel cell 12a that is covered by a red filter provides a representation of a red color of the portion of the image striking the cell 12a. To ascertain the blue color of the portion of the image otherwise striking the cell 12a (if not for the red filter), the DSP engine 30 averages (a weighted representation of) the outputs of adjacent pixel cells 12b and 12c (i.e., adjacent pixel cells covered by a blue filter) to interpolate the missing blue color. The DSP engine 30 also interpolates the green color of the portion of the image that would other strike the cell 12a in a similar manner.

SUMMARY OF THE INVENTION

In general, in one aspect, the invention features an imager that has first and second photosensitive sites and an interpolator located in a semiconductor substrate. The first photosensitive site is configured to receive light having a spectral component, and the second photosensitive site is configured to measure the level of the spectral component in light received by the second photosensitive site. The interpolator is configured to estimate the level of the spectral component in the light received by the first photosensitive site based on the measurement by the second photosensitive site.

Implementations of the invention may include one or more of the following. The first and/or second photosensitive sites may include a pixel cell and a filter that covers the pixel cell. The filter covering the first photosensitive site may be configured to prevent the spectral component from striking the pixel cell, and the filter covering the second photosensitive site may be configured to allow the spectral component to strike the pixel cell. The first photosensitive site may also be configured to measure the level of another spectral component in light received by the first photosensitive site, and the interpolator may be also configured to estimate the level of the another spectral component in the light received by the second photosensitive site based on the measurement by the first photosensitive site.

The imager may also include a third photosensitive site (also located in the substrate) that is configured to measure the level of the other spectral component in light received by the third photosensitive site. The first photosensitive site may also be configured to receive light having the another spectral component, and the interpolator may also be configured to estimate the level of the spectral components in the light received by the first photosensitive site based on the measurements by the second and third photosensitive sites.

In general, in another aspect, the invention features an imager that has first and second photosensitive sites and an interpolator located in a semiconductor substrate. Each first photosensitive site is configured to receive light having a spectral component, and each second photosensitive site is configured to measure the level of the spectral component in light received by the second photosensitive site. The interpolator is configured to estimate the level of the spectral component in the light received by at least one of the first photosensitive sites based on the measurements by the second photosensitive sites.

Implementations of the invention may include one or more of the following. The interpolator may include an averaging circuit that is configured to perform the estimation by averaging some of the measurements by the second photosensitive sites. The interpolator may also include a scaling circuit that is configured to scale some of the measurements by predetermined coefficients before being averaged by the averaging circuit. The scaling circuit may be programmable to change one or more of the coefficients. The first and second photosensitive sites may be part of an array of photosensitive sites (e.g., located in a column of the array, a row of the array, or arranged in a rectangular block of an array).

In general, in another aspect, the invention features a color imager for use with light having first, second and third primary color bands. The imager has first, second and third photosensitive sites and an interpolator located in a semiconductor substrate. Each first photosensitive site is configured to receive a portion of the light and measure a level of the first primary color band in the portion of light received by the first photosensitive site. Each second photosensitive site is configured to receive a portion of the light and measure a level of the second primary color band in the portion of light received by the second photosensitive site. Each third photosensitive site is configured to receive a portion of the light and measure a level of the third primary color band in the portion of light received by the third photosensitive site. The interpolator is configured to estimate the levels of the second and third primary color bands in the light received by the first photosensitive sites based on the measurements by the second and third photosensitive sites; estimate the levels of the first and third primary color bands in the light received by the second photosensitive sites based on the measurements by the first and third photosensitive sites; and estimate the levels of the first and second primary color bands in the light received by the third photosensitive sites based on the measurements by the first and second photosensitive sites.

Implementations of the invention may include one or more of the following. The interpolator may be also configured to furnish a representation of the levels of the first, second and third primary color bands for each of the first, second and third photosensitive sites. The representation for each site may include a representation (e.g., a true color representation) of the color of the light received by the site.

In general, in another aspect, the invention features a method that includes using a first photosensitive site located in a semiconductor substrate to receive light having a spectral component. A second photosensitive site located in the substrate is used to measure the level of the spectral component in light received by the second photosensitive site. An interpolator located in the substrate is used to estimate the level of the spectral component in the light received by the first photosensitive site based on the measurement by the second photosensitive site.

In general, in another aspect, the invention features a method that includes using first photosensitive sites located in a semiconductor substrate to receive light having a spectral component. Second photosensitive sites located in the substrate are used to measure the level of the spectral component in light received by each of the second photosensitive sites. An interpolator located in the substrate is used to estimate the level of the spectral component in the light received by at least one of the first photosensitive sites based on the measurements by the second photosensitive sites.

Among the advantages of the invention are one or more of the following. True color imaging occurs on a single semiconductor chip. The pixel cells of the imager and the pixels of the display have a one-to-one correspondence Only one imager is required. The imager may be used with many commonly used color filter patterns.

Other advantages will become apparent from the following description and from the claims.

DESCRIPTION OF THE PREFERRED EMBODIMENTS

Figure 5:
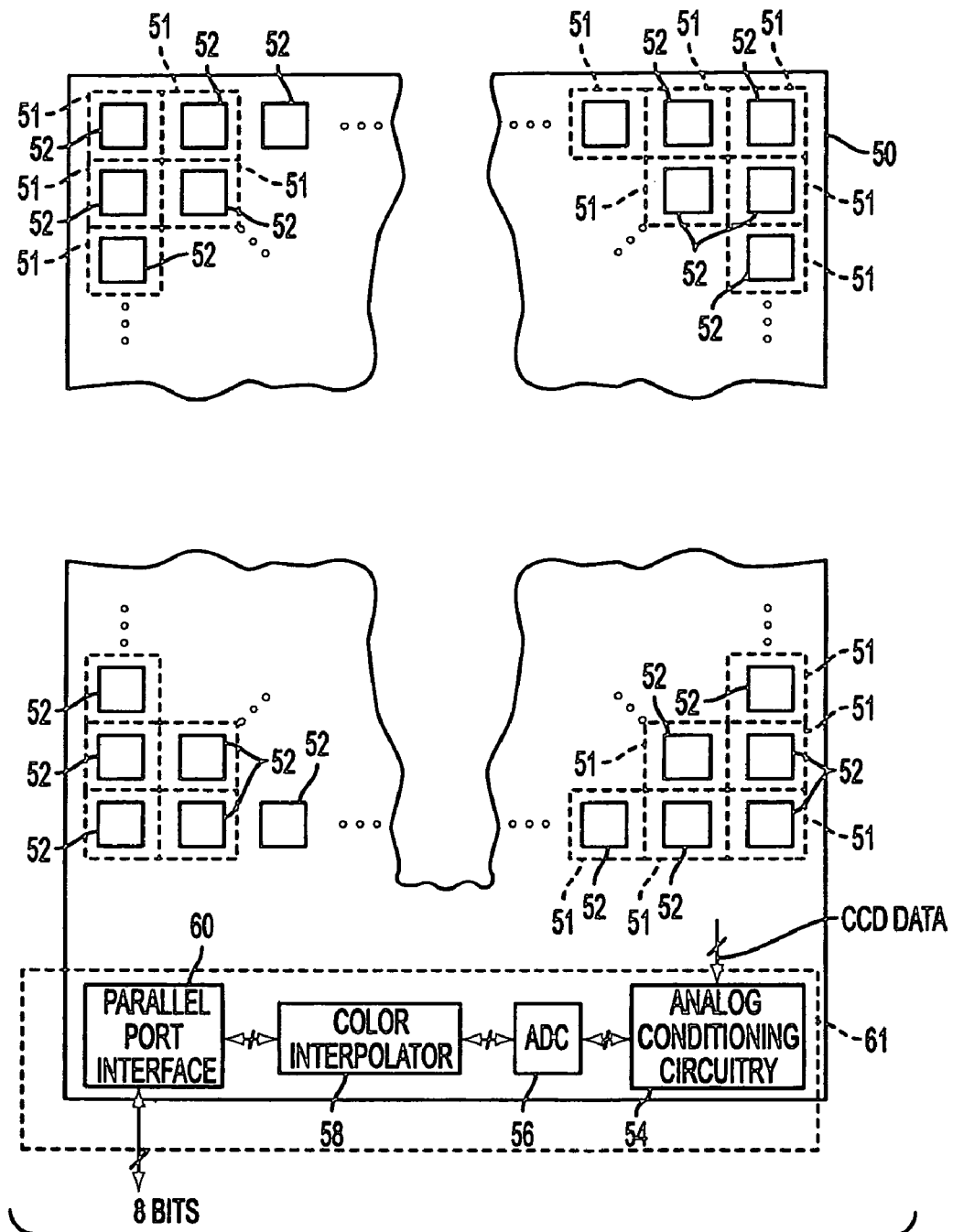
FIG. 5 is a schematic view of a semiconductor imager.

FIG. 5 shows a CMOS imager 50 located on a monolithic semiconductor substrate, or chip. The illustrated embodiment is constructed to furnish twenty-four bit True Color data, e.g., eight bits representing a red color, eight bits representing a green color, and eight bits representing a blue color, for every photosensitive site 51. Each photosensitive site 51 is a region of the imager 50 that includes a pixel cell 52. As a result of this arrangement, a one-to-one correspondence between pixel cells 52 of the imager 50 and pixels of a display used to display the image captured by the imager 50 is preserved without requiring a larger imager, complicated optics, or off-chip color interpolation.

The imager 50 has an on chip color interpolator 58 which, for each photosensitive site 51, estimates the level of the primary colors that are not sensed by the pixel cell 52 at that photosensitive site 51. The color sensed by the pixel cell 52 is determined by a primary color filter of the site 51 that covers the pixel cell 52. In this manner, the primary color filter (which is a red, green or blue filter) covers the cell 52. Each cell 52 senses the level of light by measuring the intensity of the light in one of the primary color bands (e.g., red, green or blue) but does not sense the level of light in the other two primary color bands. The interpolator 58 estimates the missing color levels for the site 51 by using the outputs of pixel cells 52 in adjacent photosensitive sites 51 that are sensing these color levels.

Figure 1:
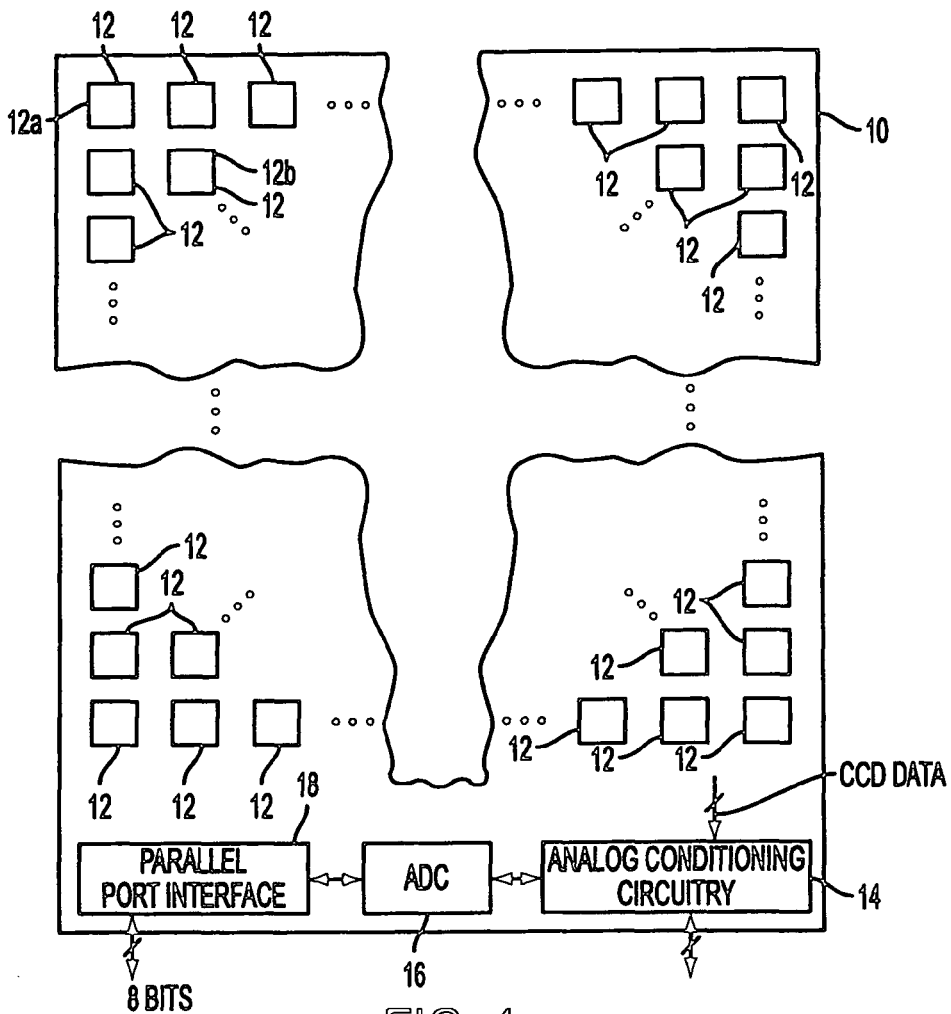
FIG. 1 is a schematic view of a semiconductor imager.
Figure 2:
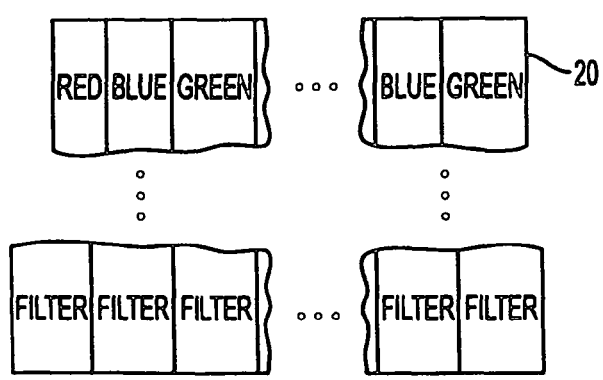
FIG. 2 is a schematic view of color filters.
Figure 3:
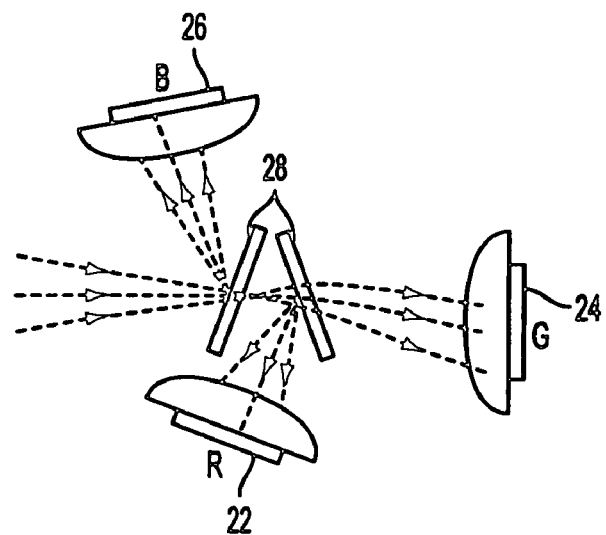
FIG. 3 is a block diagram of a system to interpolate color.
Figure 4:
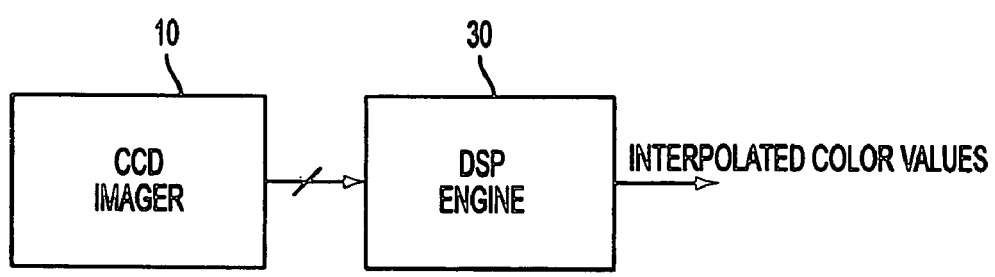
FIG. 4. is a schematic view of an optical system to separate light into primary color components.

The photosensitive sites 51 (and corresponding pixel cells 52) are arranged in a rectangular array of rows and columns. To estimate the missing color levels for a given photosensitive site 51 (i.e. to estimate the color levels not sensed by the site 51), the interpolator 58 may be configured to use pixel cells 52 in the same row, same column, or both (e.g., the interpolator 58 may use a block of pixel cells 52 that surround the give photosensitive site 51). Although many configurations are possible, as discussed below, a multi-band column oriented filter pattern (see FIG. 2) is assumed, and pixel cells 52 from the same row are used in the interpolation.

Figure 6:
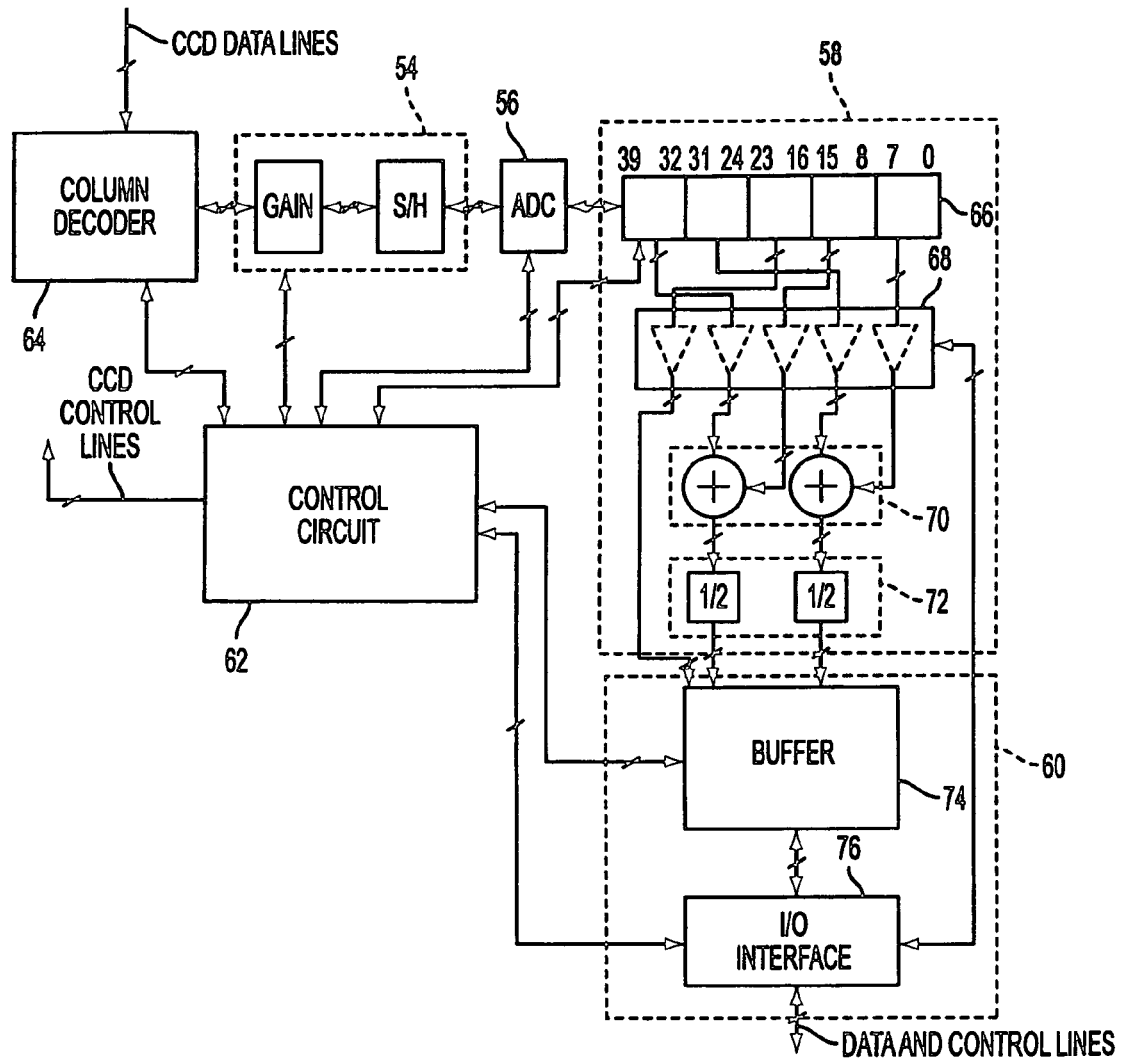
FIG. 6 is an electrical schematic diagram of circuitry of the imager of FIG. 5.

FIG. 6 shows analog conditioning circuitry 54 to perform correlated double sampling of the analog outputs of the pixel cells 52 and provide gain control. This circuitry receives the analog outputs of the pixel cells 52. The circuitry 54 furnishes its output to an analog-to-digital converter 56 which converts the analog outputs of the pixel cells 52 into digital data and supplies the digital data to the interpolator 58. After an integration interval has passed, the pixel cells 52 have captured a snapshot of the image. At that time a column decoder 64 begins routing the outputs of the pixel cell 52 to the analog conditioning circuitry 54 for processing. The decoder 64 sequentially selects one row of pixels 52 and serially provides the analog outputs of the pixel cells 52 of the row that is selected (i.e., provides all of the columns of the selected row) to the analog conditioning circuitry 54. A control circuit 62 controls the integration of the light by the pixel cells 52 and the overall timing of the imager 50. The True Color data may be read from the imager 50 at a parallel port interface 60.

The interpolator 58 estimates the levels of the missing color levels for a given photosensitive site 51 using the outputs of other pixel cells 52 that are close to the given photosensitive site 51. As one example, the interpolator 58 may be configured to use a one dimensional approach by serially processing photosensitive sites 51 and the corresponding pixel cells 52 at the photosensitive sites 51 from the same row of the array. The processing of a given photosensitive site 51 includes retrieving the color level sensed by the pixel cell 52 of the given photosensitive site 51 and estimating the missing color levels. The estimation uses the interpolator 58 to form the outputs of the last two pixel cells 52 that were processed and the next two pixel cells 52 to be processed to estimate the two missing color levels for the photosensitive site 51 currently being processed. The interpolator 58 performs a weighted average of the outputs from the pixel cells 52 to estimate the missing color levels.

Figures 7A, 7B:
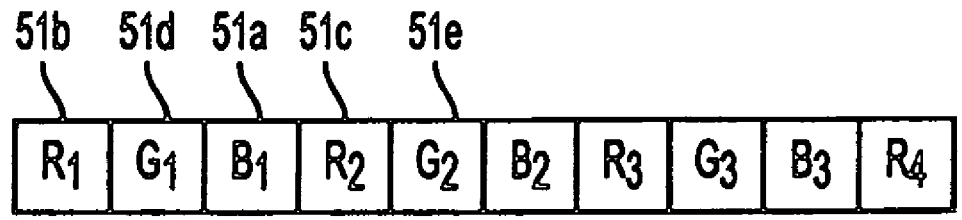
FIG. 7A is a representation of the contents of the serial register of FIG. 6.
FIG. 7B is a representation of the contents of the buffer of FIG. 6.

For example, FIG. 7A shows a photosensitive site 51a is covered by a blue filter which filters out red and green light from striking the corresponding pixel cell 52. To estimate the red light that would otherwise strike the pixel cell 52 if not for the blue filter (i.e., to estimate the level of red light striking the photosensitive site 51a), the interpolator 58 forms a weighted average of the outputs of pixel cells 52 in adjacent photosensitive sites 51b and 51c that are covered by a red filter. Similarly, to estimate the green light that would otherwise strike the pixel cell 52 if not for the blue filter (i.e., to estimate the level of green light striking the photosensitive site 51a), the interpolator 58 uses a weighted average of the outputs of pixel cells 52 in adjacent photosensitive sites 51d and 51e that are covered by a green filter.

The estimate of color level for a given photosensitive site 51 uses a number of different values. The weight given by the interpolator 58 to the actual color level from another photosensitive site 51 is a function of the distance between the given photosensitive site 51 and the photosensitive site 51 furnishing the actual color level. For example, to estimate the level of green light striking the photosensitive site 51a (see FIG. 7A), the interpolator 58 might be configured to apply twice as much weight to the output of the pixel cell 52 in adjacent photosensitive site 51d than to the output of the pixel cell 52 twice as far away, such as pixel cell 52e.

FIG. 6 shows the hardware of the interpolator 58 including a five stage serial register 66. The least significant bits zero to fifteen of the register contain eight bit digital representations of actual color levels for the last two photosensitive sites 51 and corresponding pixel cells 52 processed. The most significant bits twenty-four to thirty-nine of the register 66 contain eight bit digital representations of actual color levels for the next two photosensitive sites 51 and corresponding pixel cells 52 to be processed. The other bits sixteen to twenty-three of the register 66 contain an eight bit representation of the actual color level for the photosensitive site 51 and corresponding pixel cell 52 being processed.

Each photosensitive site 51 assembles the twenty-four bit True Color representation in a buffer 74 (of the parallel port interface 60) as follows. The interpolator 58 transfers the bits 16-23 of the register 66 which are representative of an actual color level, to the buffer 74 without any further processing. The interpolator 58 assigns a weight via scalar multipliers to the values represented by the bits 32-39 and 8-15 of the register 66. The interpolator 58 also averages (via adders 70 and a "divide-by-two" circuitry 72) these values to estimate one of the missing color values, and stores the resultant eight bit color value in the buffer 74. The twenty-four bit representation is completed by the interpolator 58 assigning a weight to the values represented by the bits 24-31 and 0-7, average these values together, and stores the resultant eight bit color value in the buffer 75. The twenty-four bit True Color value may then be retrieved from the buffer 74 (and from the parallel port interface 60) via an I/O interface 76 that is configured to communicate with off chip devices.

FIGS. 7A and 7B show the red-green-blue ("RGB") byte ordering of the stored twenty-four bit color values 69 circularly rotates, and the most significant byte of the color value 69 corresponds to the actual color level sensed by the pixel cell 52 in the corresponding photosensitive site 51. As an example, for the twenty-four bit color value 69a representative of the color sensed by the pixel cell 52 in photosensitive site 51a, the most significant byte represents the actual blue color level (B1) sensed by the pixel cell in photosensitive site 51a, the next significant byte represents the estimated red color level for the photosensitive site 51a, and the least significant byte represents the estimated green color level for the photosensitive site 51a.

The gains of the scalar multipliers 68 (i.e., the weighting applied by the interpolator 58) may either be fixed or programmable. FIG. 6 shows the gains being programmable, with the I/O interface 76 having writable and readable registers used to program the gains of the multipliers.

Figure 8:
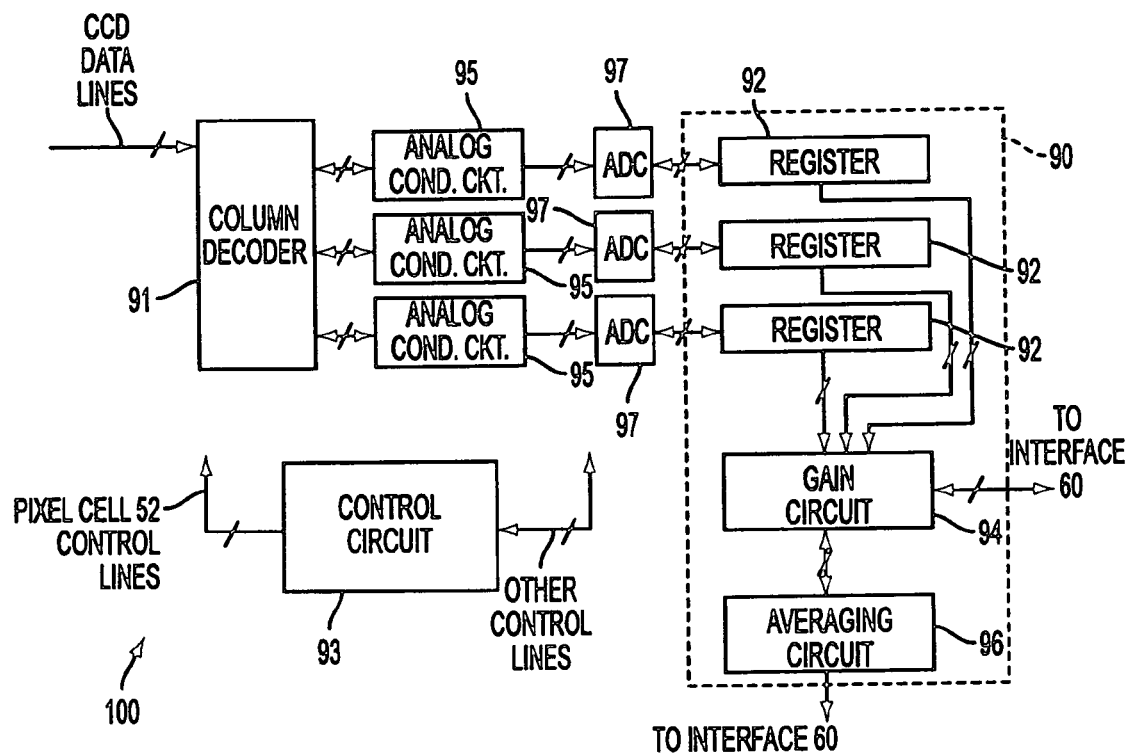
FIG. 8 is a electrical schematic diagram of another imager.

The one dimensional color interpolation approach discussed above can be extended to two dimensional interpolation. In such an approach, the outputs from pixel cells 52 from more than one row are used to estimate the missing color levels of a photosensitive site 51. For example, FIG. 8 shows another interpolator 90 of another imager 100 having three serial, five stage registers 92. Similar to the register 66, each register 92 contains digital representations of five adjacent pixel cells 52 of one of three adjacent different rows. Each register 92 has representations from the same column of pixel cells 52. Thus, the bits of the registers 92 represent the outputs of a 5×3 block of pixel cells 52. The interpolator 90 includes analog conditioning circuitry 95 and an A/D converter 97 for each register 92. The integrator 90 also has a gain circuit 94 (e.g., scalar multipliers) and an averaging circuit 96 to provide weighted averaging for the interpolation. The imager 100 uses a column decoder 91 that has three serial outputs associated with three different adjacent rows of pixel cells 52. A control circuit 94 controls the integration of the light by the pixel cells 52 and the overall timing of the imager 100.

Other embodiments are within the scope of the following claims. For example, other filter patterns, such as a checkered filter pattern may cover the array of pixel cells. The array may have more pixel cells dedicated to sensing one of the primary colors than to the other primary colors. For example, to improve the perceived luminance of the reproduced image, the array may have more pixel cells dedicated to sensing green (a color that closely matches the luminance of the human eye) color levels. The imager may represent color in a format other than a True Color representation. For example, six bits may be used to represent a green color level, five bits may be used to represent a blue color level, and five bits may be used to represent a red color level.

What is claimed is:

1. A CMOS imager comprising:
   an array of pixels, disposed on a semiconductor substrate, including a red pixel to provide a red pixel signal to indicate an amount of red light sensed by the red pixel, a green pixel to provide a green pixel signal to indicate an amount of green light sensed by the green pixel, and a blue pixel to provide a blue pixel signal to indicate an amount of blue light sensed by the blue pixel;
   an interpolator, disposed on the semiconductor substrate, to receive pixel signals corresponding to groups of pixels of the array, including, for at least one of the groups, a first number of rows of pixels and at least the first number of columns of pixels, and to estimate an amount of green and blue light received by the red pixel using at least the green and blue pixel signals, an amount of red and blue light received by the green pixel using at least the red and blue pixel signals, and an amount of red and green light received by the blue pixel using at least the red and green pixel signals;
   at least the first number of analog-to-digital converters, disposed on the semiconductor substrate, coupled to receive pixel signals from the array, to convert the red, green, and blue pixel signals from analog to digital signals, wherein the first number is at least one;
   a register set, disposed on the semiconductor substrate, that is programmable via an external interface, wherein the interpolator is to operate depending on one or more values to be stored in the register set; and
   a parallel port interface, external to the imager, to provide output signals associated with the red, green, and blue pixel signals.

2. The CMOS imager of claim 1, wherein the one of the groups is a block of pixels.

3. The CMOS imager of claim 1, further comprising a plurality of conditioning circuits, disposed on the semiconductor substrate, coupled to receive pixel signals from the array, each of the plurality of conditioning circuits corresponding to a respective one of the analog-to-digital converters, wherein the conditioning circuits are to perform correlated double sampling.

4. The CMOS imager of claim 3, wherein the plurality of conditioning circuits includes as many conditioning circuits as there are analog-to-digital converters.

5. The CMOS imager of claim 4, wherein the conditioning circuits are to further perform signal sample and hold.

6. The CMOS imager of claim 4, wherein the conditioning circuits are to further perform gain control.

7. The CMOS imager of claim 3, wherein the conditioning circuits are to further perform gain control.

8. The CMOS imager of claim 3, wherein at least one of the analog-to-digital converters is to process pixel signals of at least two different colors.

9. The CMOS imager of claim 1, wherein at least one of the analog-to-digital converters is to process at least two pixel signals selected from a group consisting of the red pixel signal, the green pixel signal, and the blue pixel signal.

10. The CMOS imager of claim 1, wherein the interpolator is to perform interpolation in accordance with the one or more values to be stored in the register set.

11. The CMOS imager of claim 10, wherein the interpolator is to weight pixel values in accordance with the one or more values to be stored in the register set.

12. The CMOS imager of claim 1, wherein the parallel port interface is to provide the red, green, and blue pixel signals.

13. The CMOS imager of claim 12, wherein the parallel port interface is to provide the red, green, and blue pixel signals each as eight bit values.

14. The CMOS imager of claim 13, wherein the parallel port interface is to provide the red, green, and blue pixel signals as five, six, and five bit values, respectively.

15. The CMOS imager of claim 1, wherein the parallel port interface is to further provide output signals associated with interpolated signals from the interpolator depending on the one or more values to be stored in the register set.

16. The CMOS imager of claim 1, wherein the groups of pixels comprise only red, green, and blue pixels.

17. A CMOS imager comprising:
    an array of pixels, disposed on a semiconductor substrate, including a red pixel to provide a red pixel signal to indicate an amount of red light sensed by the red pixel, a green pixel to provide a green pixel signal to indicate an amount of green light sensed by the green pixel, and a blue pixel to provide a blue pixel signal to indicate an amount of blue light sensed by the blue pixel;
    an interpolator, disposed on the semiconductor substrate, to receive a group of pixel signals associated with a group of pixels of the array having M rows of pixels and N columns of pixels, the interpolator to estimate an amount of light of first and second colors, received but not sensed by a target pixel, using selected pixel signals within the group of pixel signals associated with pixels that sense light of the first and second colors;
    at least M analog processing circuits, disposed on the semiconductor substrate, coupled to receive pixel signals from the array, each of the analog processing circuits comprising respective circuitry to perform correlated double sampling and analog-to-digital conversion, wherein each of the analog processing circuits is coupled to a respective one of at least M signal lines from a column decoder;
    a writable and readable register set, disposed on the semiconductor substrate, accessible via an external interface, to store at least one value to affect an output of interpolated pixel signals; and
    an external data output port, to provide first output signals associated with the red, green, and blue pixel signals, and, in accordance with the at least one value to be stored in the register set, to further provide second output signals associated with the amount of light of the first and second colors estimated by the interpolator to be received but not sensed by the target pixel.

18. The CMOS imager of claim 17, wherein the group of pixels is a block of pixels.

19. The CMOS imager of claim 17, wherein each of the analog processing circuits further comprises respective circuitry to perform signal sample and hold.

20. The CMOS imager of claim 19, wherein each of the analog processing circuits further comprises respective circuitry to perform signal gain.

21. The CMOS imager of claim 17, wherein the imager comprises an analog processing circuit corresponding with each analog-to-digital converter.

22. The CMOS imager of claim 17, wherein at least one of the analog processing circuits is to process pixel signals of at least two different colors.

23. The CMOS imager of claim 17, wherein the interpolator is to perform interpolation in accordance with the at least one value to be stored in the register set.

24. The CMOS imager of claim 23, wherein the interpolator is to weight pixel values in accordance with the at least one value to be stored in the register set.

25. The CMOS imager of claim 17, wherein the external data output port is to provide the red, green, and blue pixel signals each as eight bit values in parallel.

26. The CMOS imager of claim 25, wherein the external data output port is to further provide the red, green, and blue pixel signals as five, six, and five bit values, respectively.

27. The CMOS imager of claim 17, wherein the external data output port is to provide the second output signals depending on the at least one value to be stored in the register set.

28. The CMOS imager of claim 17, wherein the group of pixels comprises only red, green, and blue pixels.

29. A system comprising:
a writable and readable register set disposed on a semiconductor substrate and coupled via an external input-output port to an external programming interface, the register set storing a value written to the register set via the programming interface;
an array of photodiodes, disposed on the semiconductor substrate, including a first photodiode to provide a first signal to indicate an amount of red light sensed by the first photodiode, and a second photodiode to provide a second signal to indicate an amount of blue light sensed by the second photodiode;
an estimation circuit, disposed on the semiconductor substrate, to receive a group of signals associated with a group of photodiodes of the array and to use the group of signals to estimate an amount of red and blue light received by a pixel having a photodiode configured to sense green light, wherein the group of signals are associated with photodiodes that sense red and blue light, the estimation circuit to provide first and second estimated signals to indicate the amount of the red and blue light, respectively, estimated by the estimation circuit to be received by the pixel; and
an external data output port from which to read out the first output signals associated with the first and second signals that indicate the amount of red and blue light sensed by the first and second photodiodes, respectively, and, based at least in part on the value stored in the register set, to read out estimated output signals associated with the first and second estimated signals from the estimation circuit.

30. The system of claim 29, wherein the group of photodiodes includes a first number of rows of photodiodes and at least the first number of columns of photodiodes.

31. The system of claim 30, wherein the group of photodiodes is a block of photodiodes.

32. The system of claim 30, further comprising at least the first number of analog processing circuits, disposed on the semiconductor substrate, coupled to receive pixel signals from the array, each of the analog processing circuits comprising respective circuitry to perform correlated double sampling and analog-to-digital conversion.

33. The system of claim 32, wherein each of the analog processing circuits is coupled to a respective one of at least the first number of signal lines from a column decoder disposed on the semiconductor substrate.

34. The system of claim 32, wherein each of the analog processing circuits further comprises respective circuitry to perform signal gain.

35. The system of claim 32, wherein the imager comprises an analog processing circuit corresponding with every analog-to-digital converter.

36. The system of claim 32, wherein at least one of the analog processing circuits is to process pixel signals of at least two different colors.

37. The system of claim 29, wherein the estimation circuit is to estimate in accordance with the value stored in the register set.

38. The system of claim 37, wherein the estimation circuit is to weight values in accordance with the value stored in the register set.

39. The system of claim 29, wherein the estimation circuit is to estimate in accordance with a plurality of values stored in the register set, including the value stored in the register set.

40. The system of claim 39, wherein the estimation circuit is to adjust weighting factors in accordance with the plurality of values stored in the register set.

41. The system of claim 40, wherein the values stored in the register set are the weighting factors.

42. The system of claim 29, wherein the external data output port is to provide the first and estimated output signals as eight bit values in parallel.

43. The system of claim 29, wherein the external data output port is to provide the estimated output signals depending at least on the value stored in the register set.

44. A method of operating a CMOS imager comprising:
receiving light in an array of pixels, wherein the array of pixels is disposed on a semiconductor substrate, and wherein the array of pixels includes a red pixel to provide a red pixel signal to indicate an amount of red light sensed by the red pixel, a green pixel to provide a green pixel signal to indicate an amount of green light sensed by the green pixel, and a blue pixel to provide a blue pixel signal to indicate an amount of blue light sensed by the blue pixel;
performing correlated double sampling and analog-to-digital conversion on a group of pixel signals using at least M analog processing circuits, wherein the analog processing circuits are disposed on the semiconductor substrate and coupled to receive pixel signals from the array, and wherein each of the analog processing circuits is coupled to a respective one of at least M signal lines from a column decoder;
providing the group of pixel signals to an interpolator, wherein the interpolator is disposed on the semiconductor substrate, and wherein the group of pixel signals are associated with a group of pixels of the array having M rows of pixels and N columns of pixels,
estimating, using the interpolator, an amount of light of first and second colors, received but not sensed by a target pixel, using selected pixel signals within the group of pixel signals associated with pixels that sense light of the first and second colors;
programming a writable and readable register set to store at least one value to affect an output of interpolated pixel signals, wherein the register set is disposed on the semiconductor substrate and is accessible via an external interface; and
outputting, through an external data output port, first output signals associated with the red, green, and blue pixel signals, and, in accordance with the at least one value to be stored in the register set, second output signals associated with the amount of light of the first and second colors estimated by the interpolator to be received but not sensed by the target pixel.

45. The method of claim 44, wherein the group of pixels is a block of pixels.

46. The method of claim 44, further comprising performing signal sample and hold using the analog processing circuits.

47. The method of claim 46, further comprising performing signal gain using the analog processing circuits.

48. The method of claim 44, wherein each analog processing circuit corresponds with an analog-to-digital converter.

49. The method of claim 44, further comprising processing pixel signals of at least two different colors using at least one of the analog processing circuits.

50. The method of claim 44, further comprising performing interpolation in accordance with the at least one value to be stored in the register set using the interpolator.

51. The method of claim 50, further comprising weighing pixel values in accordance with the at least one value to be stored in the register set using the interpolator.

52. The method of claim 44, further comprising outputting the red, green, and blue pixel signals each as eight bit values in parallel.

53. The method of claim 44, further comprising outputting the red, green, and blue pixel signals as five, six, and five bit values, respectively.

54. The method of claim 44, further comprising outputting the second output signals depending on the at least one value to be stored in the register set.

55. The method of claim 44, wherein the group of pixels comprises only red, green, and blue pixels.

56. A method of operating a system comprising:
writing a value to a writable and readable register set via an external programming interface, wherein the register set is disposed on a semiconductor substrate and coupled via an external input-output port to the external programming interface;
receiving light in an array of photodiodes, wherein the array of photodiodes is disposed on the semiconductor substrate, and wherein the array of photodiodes includes a first photodiode to provide a first signal to indicate an amount of red light sensed by the first photodiode, and a second photodiode to provide a second signal to indicate an amount of blue light sensed by the second photodiode;
providing a group of signals to an estimation circuit disposed on the semiconductor substrate, wherein the group of signals is associated with a group of photodiodes of the array that sense red and blue light;
estimating, using the estimation circuit and the group of signals, an amount of red and blue light received by a pixel having a photodiode configured to sense green light, and providing first and second estimated signals to indicate the amount of the red and blue light, respectively, estimated to be received by the pixel; and
outputting, using an external data output port, the first output signals associated with the first and second signals that indicate the amount of red and blue light sensed by the first and second photodiodes, respectively, and, based at least in part on the value stored in the register set, estimated output signals associated with the first and second estimated signals from the estimation circuit.

57. The method of claim 56, wherein the group of photodiodes includes a first number of rows of photodiodes and at least the first number of columns of photodiodes.

58. The method of claim 57, wherein the group of photodiodes is a block of photodiodes.

59. The method of claim 57, further comprising performing correlated double sampling and analog-to-digital conversion using at least the first number of analog processing circuits, wherein the analog processing circuits are disposed on the semiconductor substrate and coupled to receive pixel signals from the array.

60. The method of claim 59, wherein each of the analog processing circuits is coupled to a respective one of at least the first number of signal lines from a column decoder disposed on the semiconductor substrate.

61. The method of claim 59, further comprising performing signal gain using the analog processing circuits.

62. The method of claim 59, wherein each analog processing circuit corresponds with an analog-to-digital converter.

63. The method of claim 59, further comprising processing pixel signals of at least two different colors using at least one of the analog processing circuits.

64. The method of claim 56, wherein the estimation circuit estimates in accordance with the value stored in the register set.

65. The method of claim 64, wherein the estimation circuit weights values in accordance with the value stored in the register set.

66. The method of claim 56, wherein the estimation circuit estimates in accordance with a plurality of values stored in the register set, including the value stored in the register set.

67. The method of claim 66, wherein the estimation circuit adjusts weighting factors in accordance with the plurality of values stored in the register set.

68. The method of claim 67, wherein the values stored in the register set are the weighting factors.

69. The method of claim 56, further comprising outputting the first and estimated output signals as eight bit values in parallel.

70. The method of claim 56, further comprising outputting the estimated output signals depending at least on the value stored in the register set.

* * * * *

UNITED STATES PATENT AND TRADEMARK OFFICE
CERTIFICATE OF CORRECTION

| | | |
|---|---|---|
| PATENT NO. | : 7,916,193 B2 | Page 1 of 1 |
| APPLICATION NO. | : 10/774603 | |
| DATED | : March 29, 2011 | |
| INVENTOR(S) | : Eric R. Fossum | |

It is certified that error appears in the above-identified patent and that said Letters Patent is hereby corrected as shown below:

Column 2, line 24, "other" should read --otherwise--.
Column 6, line 26, "rotates" should read --rotating--.
Column 7, line 40, delete the word "the".
Column 8, line 31, "colors, received" should read --colors received,--.
Column 8, line 31, "not sensed" should read --not sensed,--.
Column 9, line 36, "signals are" should read --signals is--.
Column 11, line 16, "weighing" should read --weighting--.

Signed and Sealed this
Twentieth Day of March, 2012

David J. Kappos
*Director of the United States Patent and Trademark Office*